United States Patent [19] [11] Patent Number: 4,810,440
Yoshida et al. [45] Date of Patent: Mar. 7, 1989

[54] PROCESS FOR PRE-EXPANDING THERMOPLASTIC RESIN PARTICLES

[75] Inventors: Hiroyuki Yoshida, Akashi; Kyoichi Nakamura, Ibaraki, both of Japan

[73] Assignee: Kanegafuchi Kagaku Kogyo Kabushiki Kaisha, Osaka, Japan

[21] Appl. No.: 66,363

[22] Filed: Jun. 25, 1987

[30] Foreign Application Priority Data

Jun. 26, 1986 [JP] Japan ................................. 61-150089

[51] Int. Cl.⁴ ............................................. C08J 9/22
[52] U.S. Cl. .............................. 264/53; 264/DIG. 5; 264/DIG. 9; 264/DIG. 13; 521/56
[58] Field of Search ..................... 264/53, 51, DIG. 9, 264/DIG. 5, DIG. 13; 521/56

[56] References Cited

U.S. PATENT DOCUMENTS 3,689,608  9/1972  Hollberg et al. ................. 264/53 X
3,756,441  9/1973  Anderson et al. ................ 264/53 X
3,879,519  4/1975  Woodell ............................ 264/53 X
4,448,901  5/1984  Senda et al. ........................... 521/60

FOREIGN PATENT DOCUMENTS 0075897  4/1983  European Pat. Off. .
0140059  5/1985  European Pat. Off. .

58-19027 11/1983 Japan .

Primary Examiner—Philip Anderson
Attorney, Agent, or Firm—Armstrong, Nikaido Marmelstein & Kubovcik

[57] ABSTRACT

In a process for pre-expanding thermoplastic resin particles which comprises releasing into a low pressure zone a mixture of water and thermoplastic resin particles containing a volatile blowing agent, the mixture being maintained at an elevated temperature under pressure in a pressure vessel, the improvement which comprises releasing the mixture through a plurality of orifice plates in series in the direction of release of the mixture. According to the process of the present invention, the average cell diameter of the obtained pre-expanded particles is larger than that of the pre-expanded particles obtained by means of conventional methods. Therefore, the molded articles prepared from the pre-expanded particles according to the present invention are small in shrinkage and excellent in surface appearance, and are utilizable for use as shock absorbing, wrapping materials or structural materials such as impact-absorbing materials for cars (for example, a car bumper), which require excellent dimensional precision and heat insulating building materials.

6 Claims, 2 Drawing Sheets

PROCESS FOR PRE-EXPANDING THERMOPLASTIC RESIN PARTICLES

BACKGROUND OF THE INVENTION

The present invention relates to a process for pre-expanding thermoplastic resin particles, and more particularly to a process for pre-expanding thermoplastic resin particles capable of giving molded articles having small shrinkage and excellent surface appearance.

As to a process for pre-expanding thermoplastic resin particles, it is described in Japanese Unexamined Patent Publication (Tokkyo Kokai) No. 197027/1983 that a volatile blowing agent is impregnated into thermoplastic resin particles dispersed into water under pressure by heating in a pressure vessel and the mixture of the thermoplastic resin particles and water is released into a low pressure zone through one orifice plate under a vapor pressure of the volatile blowing agent to preexpand the thermoplastic resin particles. However, the pre-expanded particles obtained by the method described in Tokkyo Kokai No. 197027/1983 are fine in cell diameter. When the expansion molding is carried out by using the pre-expanded particles having fine cell diameters, the obtained molded articles are large in shrinkage. Also, when the pre-expansion is carried out by using thermoplastic resin particles having small diameters, there is a tendency that the obtained pre-expanded particles are small in cell diameter and therefore the articles obtained by molding the pre-expanded particles are large in shrinkage.

It is an object of the present invention to provide a process for pre-expanding thermoplastic resin particles, which can improve qualities of the molded articles by making their cell diameter large.

The above and other objects of the present invention will become apparent from the description hereinafter.

SUMMARY OF THE INVENTION

In accordance with the present invention, there is provided, in a process for pre-expanding thermoplastic resin particles which comprises releasing a mixture of water and thermoplastic resin particles containing a volatile blowing agent into a low pressure zone, the mixture being maintained at an elevated temperature under pressure in a pressure vessel, the improvement which comprises releasing the mixture through a plurality of orifice plates in series in the direction of release of the mixture.

According to the present invention, there can be obtained pre-expanded thermoplastic resin particles whose cell diameter is from 1.3 to 2 times larger than that of the pre-expanded particles prepared by means of conventional methods. The molded articles prepared from the pre-expanded particles obtained by the process of the present invention are small in shrinkage and excellent in surface appearance.

DETAILED DESCRIPTION

Figure 1:
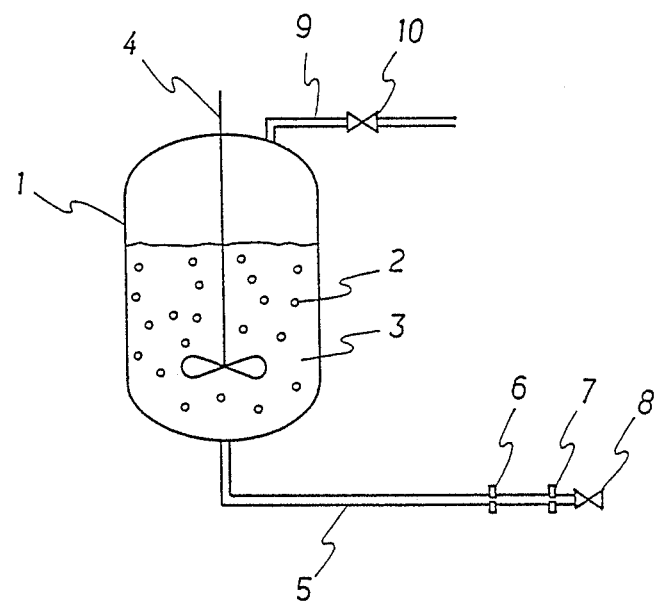
FIG. 1 is a schematic view showing an embodiment of a preparing apparatus used in the process of the present invention.

The cell diameters of the pre-expanded thermoplastic resin particles obtained by the process of the present invention are from 1.3 to 2 times larger than those of the pre-expanded particles prepared according to conventional methods. Accordingly, when the expansion molding in a mold is carried out by using the pre-expanded particles according to the present invention, the obtained molded articles are small volumetric shrinkage and are excellent in surface appearance.

According to the present invention, a blowing agent is impregnated into thermoplastic resin particles dispersed into water under pressrre and heated in a pressure vessel, and the mixture of the thermoplastic resin particles and water is released into a low pressure zone through a plurality of orifice plates in series in the direction of release of the mixture to give pre-expanded particles of the thermoplastic resin.

Examples of the thermoplastic resin used in the invention are, for instance, styrene polymers such as polystyrene, poly-α-methylstyrene, a copolymer of styrene and maleic anhydride, a blend of polyphenyleneoxide and polystyrene, a graft-copolymer of polyphenyleneoxide and polystyrene, a copolymer of acrylonitrile and styrene, a terpolymer of acrylonitrile, butadiene and styrene, a copolymer of styrene and butadiene, and a high impact polystyrene; vinyl chloride polymers such as polyvinyl chloride, a copolymer of vinyl chloride and vinyl acetate, a chlorinated polyvinyl chloride, and a copolymer of an olefin such as ethylene or propylene and vinyl chloride; polyamides, polyester resins, polyolefin resins, and the like.

Examples of the polyolefin resins are, for instance, polypropylene resins such as a random copolymer of ethylene and propylene, a random terpolymer of ethylene, propylene and butene, a block copolymer of ethylene and propylene and homopolypropylene, polyethylene resins such as a low density polyethylene, a medium density polyethylene, a high density polyethylene, a linear low density polyethylene, a copolymer of ethylene and vinyl acetate, a copolymer of ethylene and methyl methacrylate, an ionomer resin such as an ionomer resin of ethylene-methacrylic acid copolymer crosslinked with a metal ion in its molecule; another polyolefin resins such as poly-1-butene, polypentene, a terpolymer of ethylene, acrylic acid and maleic anhydride; and the like. The polyolefin resins may be used alone or in admixture thereof, and they may be used in the state of not only non-crosslinked resin but also a crosslinked resin prepared by using peroxide or radiation.

Usually, the thermoplastic resins are previously molded into particles having a desired shape such as a sphere, a cylinder, a cylindroid, or a cube, and having an average particle diameter of 0.1 to 10 mm, preferably from 1 to 5 mm, in order to easily utilize for pre-expansion The term "average particle diameter" as shown herein is a diameter calculated in their sphere volume.

In the invention, examples of the volatile blowing agent to be contained into the thermoplastic resin are, for instance, aliphatic hydrocarbons such as propane, butane, pentane and hexane; alicyclic hydrocarbons such as cyclopentane and cyclobutane; halogenated hydrocarbons such as trichloromonofluoromethane, dichlorodifluoromethane, dichlorotetrafluoroethane, trichlorotrifluoroethane, methyl chloride, methylene chloride and ethyl chloride; and the like. The blowing agent may be used alone or in admixture thereof. The amount of the blowing agent used is usually from 5 to 50 parts by weight per 100 parts by weight of the thermoplastic resin.

The blowing agent is charged into a pressure vessel with water and the thermoplastic resin particles, and the aqueous dispersion is heated under pressure. The pressure is usually from 15 to 50 $kg/cm^2G$. The heating temperature depends on the kinds of thermoplastic resin and the like, and is usually within the range of 90° to 180° C. The dispersion heated at the predetermined temperature is maintained for 20 to 60 minutes. Thus, the blowing agent is impregnated into the thermoplastic resin particles. It is preferable to further add the blowing agent to the pressure vessel to adjust the inner pressure of the vessel to the desired pressure, since the inner pressure of the vessel is being lowered with impregnating the blowing agent into the thermoplastic resin particles.

Any pressure vessels are applicable to the invention so long as the vessel can satisfactorily withstand the above-mentioned pressure and heating conditions. Examples of the pressure vessel are, for instance, an autoclave, and the like.

When dispersing the thermoplastic resin particles, the dispersing agent can be used for improving the dispersibility of the thermoplastic resin particles in water. Examples of the dispersing agent are, for instance, basic calcium tertiary phosphate, basic magnesium carbonate, basic zinc carbonate, calcium carbonate, and in addition thereto, a slight amount of a surface active agent such as sodium dodecylbenzenesulfonate, sodium n-paraffinicsulfonate or sodium α-olefinsulfonate. The amount of the dispersing agent usually is from 0.2 to 3 parts by weight per 100 parts by weight of water.

It is preferable to use the thermoplastic resin particles containing the volatile blowing agent in an amount of 20 to 100 parts by weight per 100 parts by weight of water in order to satisfy the dispersibility in water.

After heating usually at a predetermined temperature within the range of 90° to 180° C., the thus obtained mixture is released into a low pressure zone through a plurality of orifice plates in series to the direction of release of the mixture under a predetermined pressure within the range of 15 to 50 $kg/cm^2G$ with the vapor of the blowing agent to give the pre-expanded particles having large cell diameters.

When the release of the thermoplastic resin particles is carried out through not less than 2 orifice plates, there can be obtained the pre-expanded particles having a large average cell diameter, but even if the release is carried out through not less than 5 orifice plates, the effect that the cell diameters are made large is not very improved. Accordingly, it is preferable that the number of the orifice plates is from 2 to 4.

Figure 2:
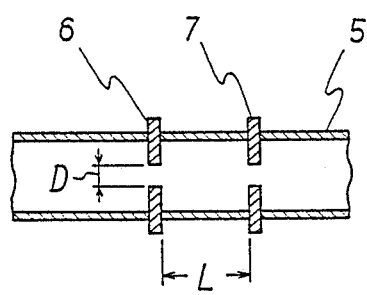
FIG. 2 is a section view of a releasing pipe provided with a plurality of orifice plates.
Figure 3:
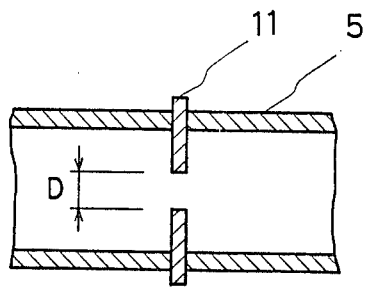
FIG. 3 shows a sectional view of an orifice type plate wherein 5 is a releasing pipe and 11 is an orifice type plate.
Figure 4:
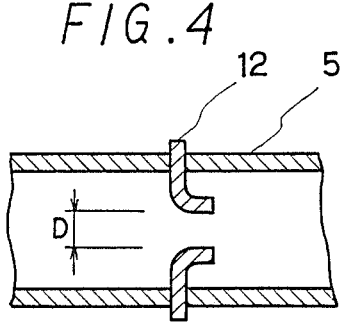
FIG. 4 shows a sectional view of a nozzle type plate wherein 5 is a releasing pipe and 12 is a nozzle type plate.
Figure 5:
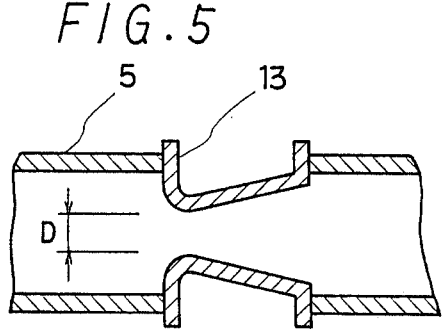
FIG. 5 shows a sectional view of a Venturi type plate wherein 5 is a releasing pipe and 13 is a Venturi type plate.

The hole size (D) of the orifice plates shown in FIG. 2 depends on the diameters or shapes of the thermoplastic resin particles and is not absolutely decided. It is preferable that the hole size (D) is larger than the diameter of the thermoplastic resin particles before pre-expansion, that is, before releasing into a low pressure zone, the diameter being calculated in their sphere volume, and is smaller than 0.8 time the inside diameter of the releasing pipe. When the hole size (D) is smaller than the diameter of the thermoplastic resin particles in the state of non-expansion, it is easy to plug the hole of the orifice plates. On the other hand, when the hole size (D) is larger than 0.8 time the inside diameter of the releasing pipe, the effect that cell diameter of the pre-expanded particle is made large is not improved.

The orifice plate may have one or more holes, and it is preferable to use the orifice plates having a plurality of holes, since the production rate can be increased. The holes of the orifice plate can have any shapes such as a circle, an oval and a polygon. Usually, the orifice plates having the circular hole are used since the shape can be easily formed.

The orifice plates are generally attached to a releasing pipe 5 at a position between a pressure vessel 1 and a releasing valve 8 as shown in FIG. 2, but the valve 8 may be provided to a position between the pressure vessel 1 and the orifice plate 6, or a position between the orifice plates 6 and 7.

As shown in FIG. 2, the plural orifice plates 6 and 7 are attached to the releasing pipe 5 in series to the direction of release of the mixture, and it is preferable that the space L between the orifice plates is from 5 to 1,000 mm. When the space L is less than 5 mm, the average cell diameter of the pre-expanded particles is the same as that of the pre-expanded particles prepared by the conventional methods. When the space L is more than 1,000 mm, it is easy to plug the hole of the orifice plate 7 provided at the rear of the orifice plate 6 by the thermoplastic resin particles.

As the orifice plate used in the present invention, any plates such as an orifice type, a nozzle type and a Venturi type can be used. These orifice types may be used alone or in admixture thereof.

The process for pre-expanding the thermoplastic resin particles of the present invention is more specifically explained by means of FIGS. 1 and 2, but the present invention is not limited thereto.

FIG. 1 is a schematic view showing an embodiment of a preparing apparatus used in the invention. The thermoplastic resin particles and the blowing agent are added into the pressure vessel 1 such as the autoclave together with a small amount of dispersing agent and water 3, and the mixture was dispersed with a stirrer 4. The pressure vessel 1 is heated to the predetermined temperature under the predetermined pressure, and is maintained for a prescribed period of time. The aqueous dispersion of the thermoplastic resin particles 2 containing the volatile blowing agent in the pressure vessel 1 is then released through the plural orifice plates 6 and 7 attached to the releasing pipe 5 in series to the direction of releasing the dispersion into a low pressure zone (usually, atmospheric pressure) by opening the releasing valve 8 to give the pre-expanded thermoplastic resin particles. A pipe 9 is a pipe for introducing the volatile blowing agent into the vessel 1. By introducing the blowing agent into the vessel 1 through the pipe 9, the inner pressure of the pressure vessel 1 is maintained at a predetermined pressure during the release of the mixture, since the inner pressure is being lowered by releasing the mixture. A valve 10 is a valve for introducing the volatile blowing agent.

The cell diameter of the pre-expanded particles prepared according to the present invention is 1.3 to 2 times larger than that of the pre-expanded particles prepared according to the conventional methods. When molding is carried out by using the pre-expanded particles prepared according to the present invention, the obtained foamed article is small in volumetric shrinkage and excellent in surface appearance.

The present invention is more specifically described and explained by means of the following Examples and Comparative Examples in which all % and parts are by weight unless otherwise noted. It is to be understood that the present invention is not limited to the Examples and Comparative Examples, and various changes and modifications may be made in the invention without departing from the spirit and scope thereof.

EXAMPLE 1

A four liter pressure vessel was charged with 100 parts of linear low density polyethylene pellets containing 0.01 part of talc (a weight:about 4 mg/pellet, a resin density: 0.920 g/cm$^3$, a melt index: 0.8 g/10 minutes, a comonomer: 1-butene), 1.2 parts of basic calcium tertiary phosphate, 0.006 part of sodium n-paraffinic sulfonate and 300 parts of water, to which 30 parts of dichlorodifluoromethane was added with stirring, and the temperature of the dispersion was raised to 114° C. There was further added dichlorodifluoromethane to the dispersion with maintaining the temperature of 114° C. to raise the inner pressure of the vessel to 27 kg/cm$^2$G. The impregnation of dichlorodifluoromethane attained equilibrium while maintaining the inner pressure of the vessel at 27 kg/cm$^2$G by supplying dichlorodifluoromethane since the inner pressure lowered with impregnating the polyethylene pellets with dichlorodifluoromethane. Then, a valve jointed to a releasing pipe (an inner diameter:1 inch) provided at a low part of the vessel was opened to release the mixture of the polyethylene pellets and water into an atmosphere of ordinary pressure through two orifice plates attached to the releasing pipe in series to the releasing direction of the mixture to pre-expand the polyethylene pellets. Each of two orifice plates used had a single orifice having an inner diameter of 4 mm and they were attached to the releasing pipe so that the space between them was 140 mm. The thus obtained pre-expanded particles had an average expansion ratio of 28 and an average cell diameter of 410 μm.

The pre-expanded particles were dried and aged at 35° C. for 24 hours, and filled in a plank mold having dimensions of 290 mm×270 mm×50 mm. The particles were heated for 20 seconds to 2 minutes by steam of about 1 kg/cm$^2$G to prepare a molded article. The molded article was dried and aged at 80° C. for 24 hours, and allowed to stand at room temperature for 6 hours.

With respect to the obtained molded article, the volumetric shrinkage and surface appearance were measured. The results are shown in Table 1. [Volumetric shrinkage]

$$\text{Shrinkage}(\%) = \left(1 - \frac{\text{Volume of the molded article (mm}^3)}{\text{Volume of the mold (mm}^3)}\right) \times 100$$

[Surface appearance]

The surface of the molded article was observed with the naked eye as to the adhesion between expanded particles and the surface smoothness. (Estimation)

:The surface is more excellent than that of conventional molded articles.

X :The surface is equal or inferior to that of conventional molded articles.

Comparative Example 1

Pre-expanded particles were prepared in the same manner as in Example 1 except that the mixture was released through one orifice plate into an atmosphere of ordinary pressure. The obtained pre-expanded particles had an average expansion ratio of 25 and an average cell diameter of 264 μm.

The pre-expanded particles were subjected to molding and the volumetric shrinkage and the surface appearance of the molded article were measured in the same manner as in Example 1.

The results are shown in Table 1.

EXAMPLE 2

The pre-expanded particles were prepared in the same manner as in Example 1 except that linear low density polyethylene pellets containing 0.01 part of talc whose diameter was smaller than that of the polyethylene pellets used in Example 1 (a weight:about 2 mg/pellet, a resin density:0.919 g/cm$^3$, a melt index:1.0 g/10 minutes, a comonomer:1-butene) were used, the temperature in the pressure vessel was elevated to 117° C., the inner pressure of the pressure vessel was maintained at 30 kg/cm$^2$G, and the space between two orifice plates was 300 mm. The obtained pre-expanded particles had an average expansion ratio of 25 and an average cell diameter of 174 μm.

The pre-expanded particles were subjected to molding and the volumetric shrinkage and the surface appearance of the molded article were measured in the same manner as in Example 1.

The results are shown in Table 1.

Comparative Example 2

Pre-expanded particles were prepared in the same manner as in Example 2 except that the mixture was released through one orifice plate into an atmosphere of ordinary pressure. The obtained pre-expanded particles had an average expansion ratio of 22 and an average cell diameter of 134 μm.

The pre-expanded particles were subjected to molding and the volumetric shrinkage and the surface appearance of the molded article were measured in the same manner as in Example 1.

The results are shown in Table 1.

EXAMPLE 3

The pre-expanded particles were prepared in the same manner as in Example 1 except that ethylene-propylene random copolymer pellets (a weight: about 2 mg/pellet, an ethylene content: 4.5%) were used instead of the polyethylene pellets, the temperature in the pressure vessel was elevated to 137° C. and an inner pressure of the pressure vessel was maintained at 31 kg/cm$^2$G. The obtained pre-expanded particles had an average expansion ratio of 43 and an average cell diameter of 203 μm.

The pre-expanded particles were impregnated with air at 80° C. for 3.5 hours under a pressure of 8.5 kg/cm$^2$G (in air) to adjust the inner pressure of the particles to from 1.8 to 2.3 atm, and filled in a plank mold having dimensions of 290 mm×270 mm×50 mm. The particles were heated for 20 seconds to 3 minutes by steam of about 2 kg/cm$^2$G to prepare a molded article. The molded article was dried and aged at 70° C. for 16 hours and allowed to stand at room temperature for 2 hours. The volumetric shrinkage and the surface appearance of the molded article were measured in the same manner as in Example 1.

The results are shown in Table 1.

Comparative Example 3

Pre-expanded particles were prepared in the same manner as in Example 3 except that the mixture was released through one orifice plate into an atmosphere of ordinary pressure. The obtained pre-expanded particles had an average expansion ratio of 41 and an average cell diameter of 138 μm.

The pre-expanded particles were subjected to molding in the same manner as in Example 3. The volumetric shrinkage and the surface appearance of the molded article were measured in the same manner as in Example 1.

The results are shown in Table 1.

TABLE 1

| Ex. No. | Average cell diameter of pre-expanded particles (μm) | Volumetric shrinkage of the molded article (%) | Surface appearance of the molded article |
| --- | --- | --- | --- |
| Ex. 1 | 410 | 4 to 7 | |
| Ex. 2 | 174 | 6 to 9 | |
| Ex. 3 | 203 | 6 to 8 | |
| Com. Ex. 1 | 264 | 9 to 12 | X |
| Com. Ex. 2 | 134 | 11 to 14 | X |
| Com. Ex. 3 | 138 | 9 to 12 | X |

As shown in Table 1, all of the pre-expanded particles obtained in Examples 1 to 3 had large average cell diameters compared to those obtained in Comparative Examples 1 to 3, that is, according to conventional methods. Accordingly, the molded articles obtained in Examples 1 to 3 were small in the volumetric shrinkage compared in Comparative Examples 1 to 3. Also, the molded articles obtained in Examples 1 to 3 were excellent in the surface smoothness and adhesion between expanded particles compared to those obtained in Comparative Examples 1 to 3.

According to the process of the present invention, the average cell diameter of the obtained pre-expanded particles is larger than that of the pre-expanded particles obtained by means of conventional methods. Therefore, the molded articles prepared from the pre-expanded particles according to the present invention by expansion molding in a mold are small in volumetric shrinkage and excellent in surface appearance, and are utilizable for use of shock absorbing, wrapping materials or structural materials such as impact-absorbing materials for cars (for example, a car bumper), which requires excellent dimensional precision, and heat insulating building materials.

In addition to the ingredients used in the Examples, other ingredients can be used in the Examples as set forth in the specification to obtain substantially the same results.

What we claim is:

1. In a process for preparing pre-expanding thermoplastic resin particles which comprises releasing into a low pressure zone a mixture of water and thermoplastic resin particles containing a volatile blowing agent, said mixture being maintained at an elevated temperature under pressure in a pressure vessel, the improvement which comprises releasing said mixture through a plurality of orifice plates in series in the direction of release of the mixture.

2. The process of claim 1, wherein said thermoplastic resin is a polyolefin resin.

3. The process of claim 2, wherein said polyolefin resin is polypropylene resin.

4. The process of claim 2, wherein said polyolefin resin is polyethylene resin.

5. The process of claim 1, wherein said orifice plates are at least one member selected from the group consisting of an orifice type plate, a nozzle type plate and a Venturi type plate.

6. The process of claim 1, wherein said orifice plates have plural holes.

* * * * *